United States Patent Office 2,812,749
Patented Nov. 12, 1957

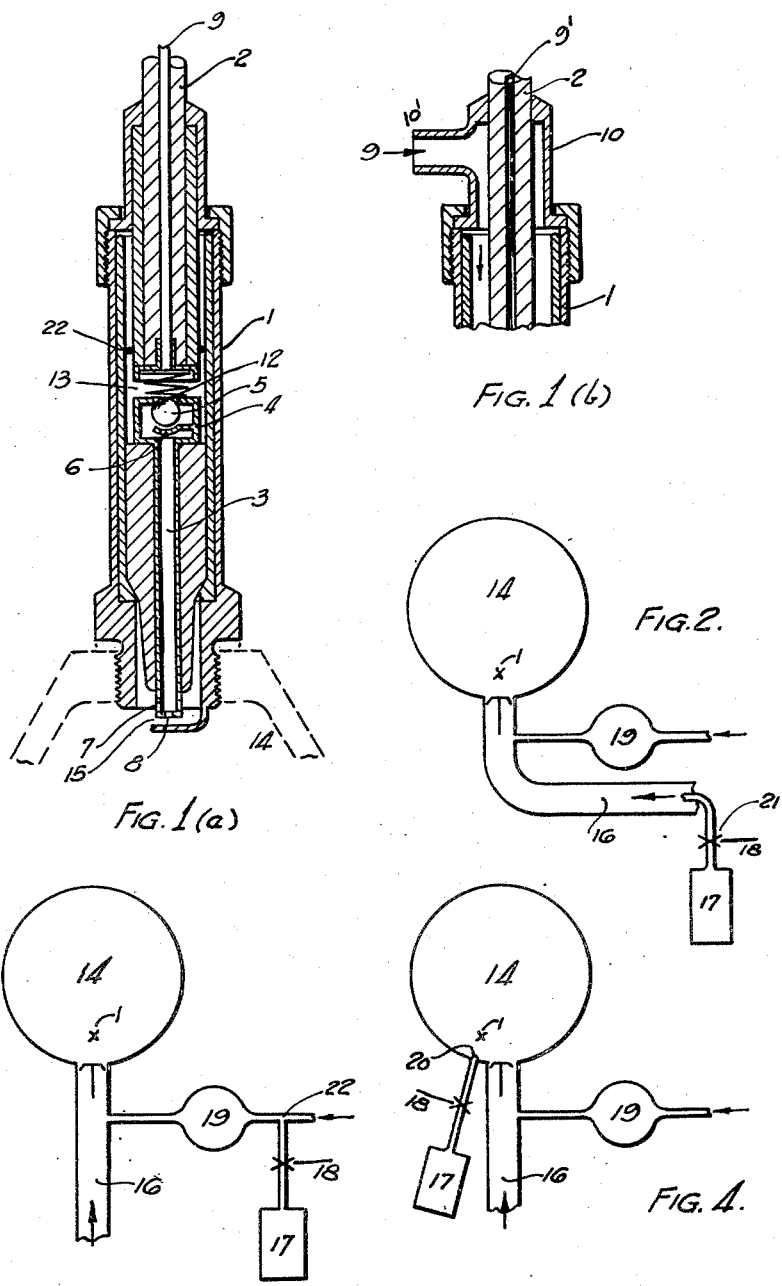

2,812,749

FUEL COMBUSTION PROMOTION

Melville F. Peters, Livingston, N. J.

Application January 10, 1955, Serial No. 480,807

2 Claims. (Cl. 123—25)

This invention relates to igniting and burning combustible mixtures of dry fuel and air and particularly to igniting and burning combustible mixtures in power plants.

Experience has shown that spark discharges containing more than a thousand times the energy required to ignite a combustible fuel air mixture containing water vapor at pressures below five atmospheres, will fail to ignite the same mixture at the same pressure when the air supplied to the mixture is so low, that practically all of the water has been removed from the air by condensation prior to mixing with the fuel. When the pressures are greater than five atmospheres the propagation of the flame can proceed without the presence of catalysts. Other observations which indicate that the lack of water vapor or an equivalent catalyst will either prevent or retard the rate at which molecules will combine is borne out when sodium is heated to a dull red heat in the presence of dry chlorine without chemical action, phosphorus, potassium, sodium and many other substances may be distilled in dry oxygen without chemical action occurring, and neither carbon or carbon monoxide will burn or combine to any appreciable extent with dry oxygen. Another example of the loss of reactivity in the absence of water or other catalysts is the failure of dry hydrogen and oxygen to combine in the presence of a silver wire melting at 1000° C., although the same dry gases in contact with a platinum wire heated to a dull redness, will cause the dry gases to explode. Flame velocity measurements made with mixtures of hydrocarbons and air, find it necessary to control the percentage of water vapor, since at low moisture concentrations the change in flame velocity of combustible mixtures of fuel and air with change in moisture, cannot be explained by considering the water as a diluent. Furthermore, there are indications that freshly combined hydrogen and oxygen is a poor catalyst and mixtures of dry hydrogen with carbon monoxide and dry oxygen do not burn efficiently.

When a combustible mixture of dry carbon monoxide and oxygen are burned, 24 percent of the heat of combustion is radiated in the infra red band at 4.4 $\mu$. When water or other catalysts are added to the mixture the energy radiated is reduced by a factor of 3 to 4, so that the portion of the energy which was formerly lost by radiation in the dry mixture, is now retained as heat energy by the molecules in the mixture. Since it is known that in dry slow burning mixtures the radiant energy has its origin in the flame where the chemical change is proceeding and not in the products of the reaction, the addition of the catalyst to increase the heat energy trapped in the combustion zone and this has the overall effect of raising the temperature of the flame.

When a spark is passed through a dry mixture of fuel and air, some of the energy in the spark will be used to disassociate and ionize the molecules in the mixture and some will be lost by radiation. When traces of water vapor are present one of the known advantages of the vapor is to reduce the energy lost by radiation in the ignition zone, so that the molecules of combustible material in the wet mixture in the ignition zone will contain more kinetic energy than the molecules in the same mixture when dried. Since it is known that the composition of each combustible mixture at a pressure P and temperature T cannot be ignited unless a specified amount of energy is transferred from the electrical discharge to the molecules in the mixture, it follows that if the escape of energy by radiation from the ignition zone can be reduced by adding a catalyst to the mixture, that the catalyzed mixture will be ignited with a smaller spark discharge than the uncatalyzed mixture. It should be pointed out, however, that the advantage of using a catalyst is not limited to suppression of radiation, but radiation can be measured in both a catalyzed and an uncatalyzed mixture and the results of these measurements expressed by numbers.

It is therefore, an object of the invention to introduce into a limited volume of a dry fuel air mixture a substance which serves as a catalyst, and thus increases the probability of igniting vapors and gases in the combustion unit of power plants. It is also an object of the invention to introduce the catalyst through the component parts of the spark plug, so that the catalyst and combustion mixture envelop the spark plug. It is also an object of the invention to add water vapor or water vapor in combination with an anti-freeze substance so that the ignition and combustion processes are catalyzed and the ice enveloping the ends of the spark plug is dissolved or melted.

The use of a catalyst to reduce the loss of energy by radiation during ignition and to improve combustion with many types of combustible material is required when the pressures and temperatures of the combustible mixture cannot tolerate the loss of energy from the flame, or must utilize the other properties of a catalyst in promoting combustion. The addition of a catalyst must be considered the opposite to the well known procedure of adding large quantities of water to the combustible mixture so that the power output of an engine can be increased without overheating the engine.

It is therefore another object of the invention to provide means for introducing the catalyst by mixing with the air prior to, or in the induction system, so that the catalyst is dispersed throughout the combustion chamber.

It is also an object of the invention to introduce the catalyzing material with the fuel, so that when the fuel is injected into the combustion chamber or cylinder, the catalyst is dispersed throughout the mixture in the combustion chamber.

It is a further object of the invention to add small amounts of catalytic material throughout the period during which the rate of combustion may be increased by the addition of a catalyst and with lean mixtures to add to or use an inflammable catalyst.

When an engine is stopped without the operator taking the precaution to dehydrate the combustion chambers by using the starter to turn over the engine for several revolutions after the ignition and fuel have been shut off, ice will often form around the spark plug.

It is therefore an object of the invention to provide means for spraying the spark plug with a catalyst such as alcohol which will melt the ice enveloping the electrodes.

It is also an object of the invention to mix a catalyst with solid and liquid fuel combinations which are lacking in moisture and other catalysts.

In the drawings:

Figure 1 is a cross-sectional view of a spark plug with means for introducing the catalyst through the component parts of the spark plug, an embodiment of the invention.

Figure 2 is a schematic view of a cylinder and an induction system with means for adding the catalyst to the air, an embodiment of the invention.

Figure 3 is a schematic view of a cylinder and induction system with means for adding the catalyst to the fuel, an embodiment of the invention.

Figure 4 is a schematic view of a cylinder and an induction system with means for adding the catalyst through a spray, an embodiment of the invention.

Referring to the drawings and first to Figure 1a, the spark plug 1 is supplied with a hollow spindle shank 3, with holes at 7 or 8 or both, to permit a catalyzing material to be forced into the combustion chamber 14. Attached to the upper end of the spindle shank 3 is a valve chamber 4 with a small opening at 12 and a ball 5 resting in a spherical surface, so that when the pressure in the combustion chamber 14 exceeds the pressure in the spark plug chamber 13, the fluids in the combustion chamber cannot flow into the spark plug chamber. A spring 6 holds the ball in place. The catalyzing material is forced into the spark plug chamber 13 through the hollow conductor 9 of the ignition cable 2. An O-ring or tight fitting sleeve 22 prevents conducting fluid from grounding the high tension circuit. If a water seal type spark plug is used, the ring 22 is not required. The remaining parts of the spark plug are conventional. Prior to starting the engine the catalyst is forced around the spark plug gap 15 and allowed to flow or defuse throughout a portion of the combustible mixture enveloping the spark plug. After the mixture has been ignited by the spark discharge, the injection of the catalyst may be continued if the combustible mixture does not contain a sufficient amount of catalytic material to cause combustion or it may be shut off if the combustible mixture has catalytic materials which are effective at elevated temperatures. If ice forms around the spark plug the catalytic material may be alcohol or other anti-freeze material which will dissolve or melt the ice. In Figure 1b the catalyzing fluid is brought into the spark plug through a T section 10' at the top of the spark plug and the hollow conductor ignition cable is replaced by conventional ignition cable in which a fluid tight seal is maintained between the conductor 9' and the insulation. The check valve combination 4, 5 and 6 may be in the spark plug or removed to 10'.

In Figure 2 the air and fuel are drawn or forced into the manifold 16 and then into the combustion chamber or cylinder 14 so that the catalyst envelopes the spark plug. The catalyzing material which is hydrogen, or hydrogen combined with or mixed with other elements, is held in container 17. The mixture shall contain some of the elements of the halogen group or sulfur combined with phosphorous or carbon which have ignition temperatures in the neighborhood of 100° C., or hydrogen, so that the water vapor formed will become contaminated, since the value of freshly formed and therefore pure water as a catalyst is questionable. The catalyzing agent shall be supplied prior to igniting the combustible mixture and the supply can be maintained at high altitudes when necessary. The valve 21 is actuated by mechanism 18 which may be manual or automatic.

In Figure 3 the catalyst is supplied to the fuel at 22 before it enters the intake manifold 16 or the combustion chamber 14. Since the catalyst increases the rate of burning of the fuel, it should not be mixed with all the fuel in types of power plants which are conducive to detonation. For jet power plant operation the mixing of the catalyst with the fuel is not objectionable.

In Figure 4 the catalyst is supplied to the combustion chamber through a separate nozzle shown at 20. The rate of flow is great enough to envelop the sparg plug 1 prior to ignition, after which the rate of flow is controlled to insure ignition and combustion of the gases.

Although several embodiments of the invention have been shown and described, it is to be expressly understood that various other changes may be made without departing from the spirit of the invention, as well understood by those skilled in the art; for example, the catalyst may be forced into the spark plug gap through the ground electrodes or through a porous insulator, or through a space between the spark plug shell and the insulator, or the order in which the fuel, air and catalyst enter the combustion chambers may be changed from that given in the description.

What I claim is:

1. A spark plug for an internal combustion engine, comprising an elongate hollow body portion having a threaded lower end for mounting the same, a central electrode in the form of a hollow spindle shank carried axially within said body portion and terminating at its lower end in the region of said threaded lower end of the spark plug body, a valve chamber formed in the upper portion of said shank, an electrically conductive check valve in said chamber to prevent the passage of fluid out of the top of the chamber, a hollow conductor in the body portion above the valve and in fluid and electrical communication therewith, a coil spring member between the hollow conductor and check valve completing the electrical path therebetween, a source of combustion promoting fluid attached to the opposite end of the conductor, a ground electrode fixed to said threaded lower end of said spark plug body and underlying, in spaced relation, said lower end of said shank to form a spark gap therewith, and said lower end of the hollow spindle having an opening therein opposite said ground electrode to direct fluid at the spark gap into impingement with said ground electrode to promote engine combustion and to maintain said spark gap free from fouling material such as ice and the like.

2. A spark plug for an internal combustion engine, comprising an elongate metallic hollow body portion having a threaded lower end for mounting the same and having a threaded upper end, an insulating sleeve snugly received within said body portion, a ceramic sleeve disposed within said insulating sleeve and positioned within the lower portion of said spark plug body and terminating at its lower end inwardly of the threaded lower end of the spark plug body, a central electrode in the form of a hollow spindle shank snugly received within the last mentioned ceramic sleeve and having its lower end terminating in the region of the threaded lower end of said spark plug body, an enlarged valve chamber formed in the upper end of said shank and resting upon the upper end of said last mentioned ceramic sleeve, a second ceramic sleeve disposed within and projecting upwardly from the upper end of said spark plug body and having its lower end terminating in spaced relation to said valve chamber, a retaining cap securing said second ceramic sleeve to the threaded upper end of said spark plug body, an electrically conductive tube extending axially within said second ceramic sleeve, a metallic seat member fixed to the lower end of said second ceramic sleeve and in electrical contact with said tube, a ball valve within said valve chamber and a coil spring disposed between said ball valve and said electrically conductive seating member, said second ceramic sleeve being disposed concentrically within and in spaced relation to said insulating sleeve, an O ring disposed between said second ceramic sleeve and said insulating sleeve to prevent fluid from passing therepast, a ground electrode fixed to said threaded lower end of the spark plug body and underlying, in spaced relation, said lower end of said shank to form a spark gap therewith, and said lower end of the spindle having an opening therein opposite said ground electrode to direct fluid at the spark gap and into impingement with said ground electrode to maintain said spark gap clear and free from fouling material.

References Cited in the file of this patent

UNITED STATES PATENTS

| | | |
|---|---|---|
| 597,860 | Rolfe | Jan. 25, 1898 |
| 1,467,139 | Curran | Sept. 4, 1923 |
| 1,809,187 | Balachowsky et al. | June 9, 1931 |
| 2,213,132 | Ackerman | Aug. 27, 1940 |
| 2,310,306 | Miller et al. | Feb. 9, 1943 |
| 2,352,267 | Kelsey | June 27, 1944 |
| 2,584,560 | Darche | Feb. 5, 1952 |

FOREIGN PATENTS

| | | |
|---|---|---|
| 15,952 | Switzerland | Dec. 15, 1897 |
| 266,193 | Switzerland | Apr. 17, 1950 |
| 425,151 | Italy | Sept. 13, 1947 |
| 971,211 | France | July 5, 1950 |